United States Patent
McFarland et al.

(10) Patent No.: US 8,738,524 B2
(45) Date of Patent: May 27, 2014

(54) SYSTEM AND METHOD FOR CREATING PARITY ON CLOSE ORDERS

(75) Inventors: Matthew McFarland, Glen Ellyn, IL (US); John Joseph Wiesner, Aurora, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/168,172

(22) Filed: Jun. 24, 2011

(65) Prior Publication Data

US 2012/0072328 A1  Mar. 22, 2012

Related U.S. Application Data

(60) Provisional application No. 61/358,311, filed on Jun. 24, 2010.

(51) Int. Cl.
*G06Q 40/00* (2012.01)
(52) U.S. Cl.
USPC .......................................................... 705/40
(58) Field of Classification Search
CPC ................................................... G06Q 40/20
USPC .................... 426/1–39; 705/1–50; 808/1–20; 777/1–30
See application file for complete search history.

(56) References Cited

U.S. PATENT DOCUMENTS

2010/0216545 A1*  8/2010  Lange et al. .................... 463/26

OTHER PUBLICATIONS

Ben Inker, the hidden risks of risk parity portfolios, Mar. 2010, GMO, web, 1-6.*

* cited by examiner

*Primary Examiner* — Marissa Liu
(74) *Attorney, Agent, or Firm* — Brinks Gilson & Lione

(57) ABSTRACT

An automated system for creating parity on close orders in an exchange configured for trading securities or derivatives is disclosed including an electronic trade engine operative to receive an order for a security or derivative at the exchange, the trade engine further operative to disseminate a request for a price message to a plurality of market makers quoting a class in response to receiving the order, wherein the request for a price message includes a parity amount for the order; an electronic book in communication with the electronic trade engine, the electronic book operative to store at least one order received by the electronic trade engine; and wherein, in response to the request for a price message, the electronic trade engine receives at least one price message that includes a fee in addition to the parity amount.

2 Claims, 2 Drawing Sheets

SYSTEM AND METHOD FOR CREATING PARITY ON CLOSE ORDERS

CROSS-REFERENCE TO RELATED APPLICATIONS

This application claims the benefit of U.S. Provisional Application No. 61/358,311, filed Jun. 24, 2010, the entirety of which is incorporated herein by reference.

TECHNICAL FIELD

The present disclosure relates to the trading of securities or derivatives, such as options or futures. More particularly, the present disclosure relates to an automated exchange trading system and method and system creating "parity on close" orders.

BACKGROUND

Derivatives are financial securities whose values are derived in part from a value or characteristic of some other underlying asset or variable (the underlying asset). The underlying asset may include securities such as stocks, market indicators and indices, interest rate, and corporate debt, such as bonds, to name but a few. Two common forms of derivatives are options contracts and futures contracts, discussed herein below.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercise the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset.

A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss. Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

BRIEF SUMMARY

In order to address the drawbacks of traditional order management as it pertains to the trading of derivatives, an automated trading platform and method is disclosed herein for providing parity to orders upon close.

According to a first aspect of the disclosure, an automated system for creating parity on close orders in an exchange configured for trading securities or derivatives is disclosed including an electronic trade engine operative to receive an order for a security or derivative at the exchange, the trade engine further operative to disseminate a request for a price message to a plurality of market makers quoting a class in response to receiving the order, wherein the request for a price message includes a parity amount for the order; an electronic book in communication with the electronic trade engine, the electronic book operative to store at least one order received by the electronic trade engine; and wherein, in response to the request for a price message, the electronic trade engine receives at least one price message that includes a fee in addition to the parity amount.

According to another aspect of the disclosure, a method for creating parity on close orders in an exchange is disclosed, the method including receiving an order for a security or derivative at the exchange; routing the order to a trade engine; disseminating a request for price message to a plurality of market makers quoting a class, wherein the request for a price message includes a parity amount for the order; receiving at least one response message at the electronic trade engine that includes a fee in addition to the parity amount; and allocating at least a portion of the order to the sender of the at least one response message.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION OF THE DRAWINGS

A system and method for trading securities, such as securities options is described herein. The trading mechanisms and rules described are based on providing incentives or limitations to particular classes of individuals or entities who are involved in trading at an exchange. For purposes of this specification, the following definitions will be used:

Broker/dealer—person or entity registered to trade for itself and/or on behalf of others at the exchange.

Public customer—person or entity, who is not a broker/dealer, trading on their own behalf through a broker/dealer or firm registered to trade at the exchange.

Firm—entity employing persons who represent the firm, or the firm's customers, on the exchange, such as market makers, floor brokers, broker/dealers, or other industry professionals.

Market maker—professional trader registered to trade at the exchange who is required to provide liquidity to a market, for example through streaming quotes for both a bid and an offer at a particular price.

Designated primary market maker (DPM)—market maker designated by the exchange to be responsible for a fair and orderly market, and to provide continuous quotes, for a particular class of options.

Market participant—any person or entity that can submit orders or quotes to an exchange.

Class of options—all series of options related to a given underlying security, where the underlying security may be, for example, publicly traded stock of a company.

Figure 1:
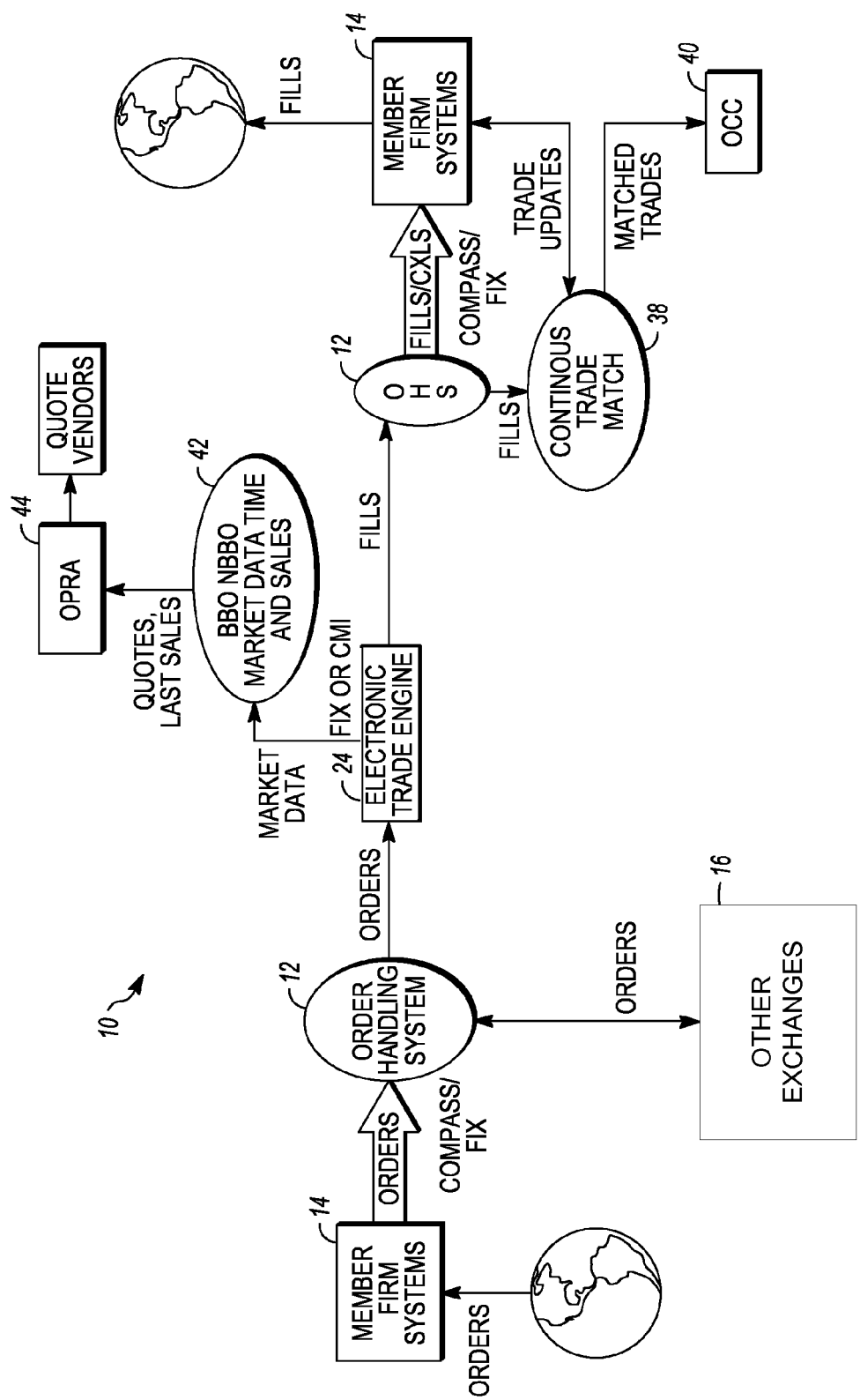
FIG. 1 is a diagram of one embodiment of an automated exchange system.

Referring to FIG. 1, one embodiment of an exchange system combining aspects of electronic, screen-based trading with traditional, open-outcry trading suitable for implementing various securities and derivatives trading methods described herein is illustrated. The system 10 receives order information for the purchase or sale of securities, for example derivatives such as stock options, from numerous sources at a central order handling system (OHS) 12. OHS 12 may be any of a number of data processing systems or platforms capable of managing multiple transactions, as are well known in the art. For example, in one embodiment, the order routing system can be implemented on a transaction processing facility (TPF) platform manufactured by IBM Corporation. For purposes of clarity, the examples herein will refer specifically to options. However, it will be appreciated that the system and methods disclosed herein might be applied to the trading of other types of securities and derivatives.

Accordingly, an exchange utilizing the system and methods described herein may manage a number of classes of derivatives, where each of the plurality of classes of derivatives are associated with an underlying asset such as a stock, a bond, a note, a future, an exchange traded fund, an index, a commodity or other known asset types.

Information, such as orders may be entered into the OHS 12 from remote member firm systems 14 (including remote market makers) and/or other exchange systems 16. The member firm systems 14 and other exchange systems 16 may be located remotely from the geographical location of the exchange and use any of a number of standard landline or wireless communication networks to direct orders electronically to the OHS 12. The member firm systems 14 and other exchange systems 16 communicate with one of several interfaces or protocols for transmitting their orders to the OHS 12. Examples of suitable interfaces are those using a distributed object interface based on the CORBA standard and available from the Object Management Group. Interfaces such as financial information exchange (FIX), which is a message-based protocol implemented over TCP/IP available from FIX Protocol, Ltd., or other known securities transaction communication protocols are also suitable protocols.

Potential destinations for these orders are the OHS 12 or the electronic trade engine 24 in communication with the OHS 12.

When a trade is completed, such as a trade that is automatically executed through the electronic trade engine 24, the fill information is sent through the electronic trade engine 24 and OHS 12. OHS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

Figure 2:
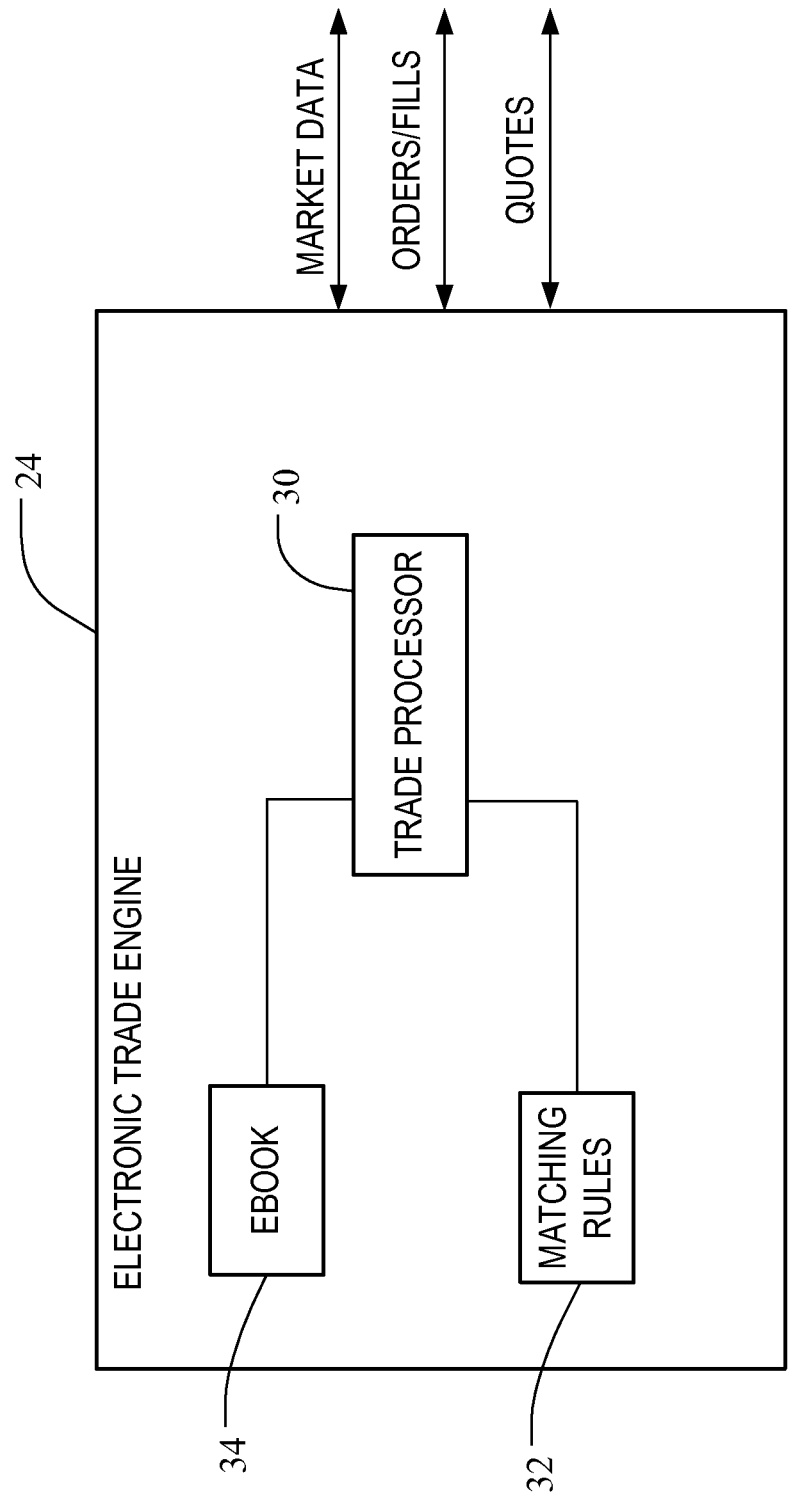
FIG. 2 is a block diagram of one embodiment of the electronic trading engine of FIG. 1.

As illustrated in FIG. 2, an electronic trade engine 24 contains a trade processor 30 that analyzes and manipulates orders according to matching rules 32 stored in the database in communication with the trade processor 30. Also included in the electronic trade engine is the electronic book (EBOOK) 34 of orders and quotes with which incoming orders to buy or sell are matched with quotes and orders resting on the EBOOK 34 according to the matching rules 32. In an embodiment, upon a match, the electronic trade engine 24 will mark the matched order or quote with the broker-specific identifier so that the broker sending the order or quote information can be identified. The electronic trade engine 24 may be a stand-alone or distributed computer system. Any of a number of hardware and software combinations configured to execute the trading methods described below may be used for the electronic trade engine 24. In one embodiment, the electronic trade engine 24 may be a server cluster consisting of servers available from Sun Microsystems, Inc., Fujitsu Ltd. or other known computer equipment manufacturers. The EBOOK 34 portion of the electronic trade engine 24 may be implemented with Oracle database software and may reside on one or more of the servers comprising the electronic trade engine 24. The rules database 32 may be C++ or java-based programming accessible by, or executable by, the trade processor 30.

When a trade is automatically executed through the electronic trade engine 24, the fill information is sent through the electronic trade engine 24 and OHS 12. OHS 12 passes the fill information to the member firm systems and to a continuous trade match (CTM) system 38 which matches the buy side and sell side of a trade which, in turn, forwards the matched trades to the Options Clearing Corporation (OCC) 40, a third party organization that will verify that all trades properly clear. The electronic trade engine 24 also sends quote and sale update information through an internal distribution system 42 that will refresh display screens within the exchange 10 and format the information for submission to a quote dissemination service such as the Options Price Reporting Authority (OPRA) 44.

"Parity on Close" Orders

In-The-Money Example

5/24/10—Customer is short 2,000 options, the XYZ European style, physically settled $50.25 call expiring on 5/24/10

At noon on 5/24/10, Customer enters a "Parity on Close" order to buy 2,000 XYZ $50.25 calls A seller (e.g., a market maker) agrees to sell the options to the Customer and offers to execute the transaction with a 1 cent premium over parity, the "accommodation fee"

XYZ settles at $50.30

Customer bought 2,000 calls to close at $0.06 (i.e. parity, or $0.05+$0.01 "accommodation fee")

Out-Of-The-Money Example

5/24/10—Customer is short 2,000 options, the XYZ European style, physically settled $50.25 call expiring on 5/24/10

At noon on 5/24/10, Customer enters a "Parity on Close" order to buy 2,000 XYZ $50.25 calls A seller agrees to sell the options to the Customer and offers to execute the transaction with a 1 cent premium over parity or the "accommodation fee"

XYZ settles at $50.20

Customer bought 2,000 calls to close at $0.01 (i.e. parity, or $0.00+$0.01 "accommodation fee")

At-The-Money Example

5/24/10—Customer is short 2,000 options, the XYZ European style, physically settled $50.25 call expiring on 5/24/10

At noon on 5/24/10, Customer enters a "Parity on Close" order to buy 2,000 XYZ $50.25 calls A seller agrees to sell the options to the Customer and offers to execute the transaction with a 1 cent premium over parity or the "accommodation fee"

XYZ settles at $50.25

Customer bought 2,000 calls to close at $0.01 (i.e. parity, or $0.00+$0.01 "accommodation fee")

Although the system and methods described herein relate to an exclusively electronic, screen-based exchange that does not include floor based, open-outcry trading, many of the procedures described may be applied to hybrid system incorporating and involving active participation from a trading floor and a screen-based electronic trading crowd. As will be appreciated by those of ordinary skill in the art, mechanisms for providing parity for orders on closing and other features described above may all be modified for application to other forms of trading within the purview and scope of the present invention. An advantage of the disclosed system and methods is that more traders at the exchange may have more opportunity to see and compete for orders, thus increasing visibility of orders and the desirability of maintaining a presence at the exchange.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. An automated system for creating parity on close orders in an exchange configured for trading securities or derivatives comprising:

an electronic trade engine having a processor operative to receive a parity on close order from a customer for a physically settled call option expiring on a day of receipt of the order at the exchange, the parity on close order corresponding to an order of a quantity of the call option for a fee above a parity amount calculated at a close of the day of receipt of the order, wherein the parity amount comprises an amount of a closing price of an underlying of the call option that is greater than a strike price for the call option;

wherein the processor is further operative to disseminate a request for price message to a plurality of market makers quoting a class of securities or derivatives corresponding to the order in response to receiving the order, wherein the request for price message includes the parity amount for the order;

a storage device having a database in communication with the processor, the database operative to store at least one order received by the processor; and wherein, in response to the request for price message, the processor receives at least one response message that includes a fee in addition to the parity amount.

2. A method for creating parity on close orders in an exchange, the method comprising:

receiving a parity on close order from a customer for a physically settled call option expiring on a day of receipt of the order at the exchange, the parity on close order corresponding to an order of a quantity of the call option for a fee above a parity amount calculated at a close of the day of receipt of the order, wherein the parity amount comprises an amount of a closing price of an underlying of the call option greater than a strike price for the call option;

routing the order to a processor of an electronic trade engine;

the processor of the electronic trade engine disseminating a request for price message to a plurality of market makers quoting a class of securities or derivatives corresponding to the order, wherein the request for price message includes the parity amount for the order;

receiving at least one response message at the processor of the electronic trade engine that includes a fee in addition to the parity amount; and the processor of the electronic trade engine allocating at least a portion of the order to a sender of the at least one response message.

* * * * *